United States Patent [19]

Turner

[11] 4,318,824
[45] Mar. 9, 1982

[54] MANUFACTURE OF POROUS CARBON

[75] Inventor: Alan Turner, Hale, England

[73] Assignee: Lancashire Tar Distillers Limited, Manchester, England

[21] Appl. No.: 175,067

[22] Filed: Aug. 4, 1980

[30] Foreign Application Priority Data

Aug. 16, 1979 [GB] United Kingdom ............... 28587/79

[51] Int. Cl.$^3$ ...................... C01B 31/10; C01B 31/12; B01J 20/20; B01J 21/18
[52] U.S. Cl. ..................................... 252/421; 208/45; 252/422; 252/423; 252/445; 423/449
[58] Field of Search ............... 252/421, 444, 445, 422, 252/423; 423/445, 449; 264/29.1, 29.3, 29.5; 208/45, 8 LE

[56] References Cited

U.S. PATENT DOCUMENTS 2,761,822  9/1956  Addison ............................... 252/421
3,663,171  5/1972  Granger ............................... 252/421

FOREIGN PATENT DOCUMENTS 1298938  12/1972  United Kingdom ............... 423/449

*Primary Examiner*—P. E. Konopka
*Attorney, Agent, or Firm*—Robert F. O'Connell

[57] ABSTRACT

A porous carbon is prepared by first carbonizing a solid fraction (obtained from pitch and/or coal by solvent extraction and preferably being one soluble in quinoline and insoluble in methanol, n-heptane and toluene) to produce a first porous carbon, absorbing into the first porous carbon liquid fraction (obtained from pitch and/or coal by solvent extraction and preferably being one insoluble in methanol and soluble in n-heptane, toluene and quinoline and/or one insoluble in methanol and n-heptane and soluble in toluene and quinoline), and carbonizing the first porous carbon containing adsorbed liquid fraction to give a second porous carbon having a specific surface area greater than that of the first porous carbon. The first porous carbon may, prior to absorption therein of the liquid fraction, be 'activated' e.g. by heating in air, to increase its pore size as may the second porous carbon. The porous carbon obtained may be used as a catalyst support.

8 Claims, No Drawings

MANUFACTURE OF POROUS CARBON

This invention is concerned with improvements in and relating to the manufacture of porous carbon.

Porous carbon may be used, inter alia, as a catalyst support, for example for catalyst systems used for purifying the exhaust gases of automobile engines. There are two principal requirements for such catalyst supports, namely that they have adequate physical strength to withstand mechanical and thermal stresses encountered in use whilst at the same time having as high a specific surface area as practically possible.

It has now been found, in accordance with the present invention, that porous carbon, suitable for use for example as a catalyst support, may be produced from pitch and/or coal by a two-stage carbonisation process using different pitch fractions separated from the pitch and/or coal by solvent extraction.

According to the invention, therefore, there is provided a process for the production of a porous carbon which comprises carbonising a first, solid fraction (obtained from pitch and/or coal by solvent extraction) to produce a first porous carbon, absorbing a second liquid fraction (obtained from pitch and/or coal by solvent extraction) into the first porous carbon, and carbonising the porous carbon containing absorbed liquid fraction to produce a second porous carbon having a higher specific surface area than the first.

The basic starting materials for use in the present invention are pitch and/or coal.

Pitches and coals comprise a complex mixture of various hydrocarbons (generally having a high content of aromatic materials-e.g. up to 80% by weight in the case of coke oven coal tar pitches and from 50 to 60% by weight in the case of petroleum derived pitches) and for use in the present invention the pitch and/or coal is separated into fractions by a solvent extraction process using a succession of solvents and the solubility or otherwise of the fractions in various solvents also serves to characterise the fractions.

It will be a matter of choice as to which solvents are employed to separate the pitch and/or coal into fractions, the basic principle underlying the selection of the solvents being that the solvents have a range of capabilities of dissolving the components of the starting material. We have found that four convenient solvents for use in separating the starting material into fractions, and by reference to which the fractions may be defined are, in increasing order of solvent power for the components of the starting material:
methanol,
n-heptane,
toluene, and
quinoline.

With reference to these four solvents, five fractions of pitch may be defined, namely:
an $\alpha$-fraction—solid insoluble fraction-insoluble in methanol, n-heptane, toluene and quinoline;
a $\beta$-fraction—solid fraction-insoluble in methanol, n-heptane and toluene; soluble in quinoline;
a $\gamma$-fraction—liquid/solid fraction-insoluble in methanol and n-heptane; soluble in toluene and quinoline;
a $\delta$-fraction—liquid fraction insoluble in methanol; soluble in n-heptane, toluene and quinoline.
an $\epsilon$-fraction—liquid fraction-soluble in methanol, n-heptane, toluene and quinoline.

The principal fractions of interest for use in accordance with the invention are the $\beta$-fraction, which is preferably used as the solid fraction carbonised to produce the first porous carbon; the $\delta$-fraction, which is preferably the liquid fraction used in the production of the second porous carbon; and the $\gamma$-fraction which, when a liquid, may also be used alone or in conjunction with the $\delta$-fraction, as the liquid fraction used in the production of the second porous carbon.

The $\alpha$-fraction is an essentially insoluble residue and may be discarded. However in the case of the ethylene cracker residue pitches, it has been found that the content of $\alpha$-fraction is low, e.g. of the order of less than 2% by weight, so that it is not necessary to separate out this fraction but it may be used in admixture with the $\beta$-fraction. Where, however, the $\alpha$-fraction content is greater, say 5% or more, as in the case of coals or coal tar pitches, then it is desirable to separate out and discard the $\alpha$-fraction. The $\gamma$-fraction, depending on the nature of the starting materal, may be solid, semisolid or liquid in nature and when liquid may be combined with the $\delta$-fraction.

The solvent extraction is conveniently effected by contacting the starting material with the various solvents in order.

Two procedures are possible. The starting material may be first contacted with the most powerful solvent (e.g. quinoline) to dissolve out the $\beta$-, $\gamma$-, $\delta$- and $\epsilon$- fractions. The resultant solution is separated from the $\alpha$-fraction, e.g. by filtration, and then contacted with the next most powerful (e.g. toluene) to precipitate out the $\beta$-fraction which is separated out, e.g. by filtration. This procedure is repeated using the solvents of decreasing solvent power to separate out the $\gamma$- and $\delta$-fractions.

Alternatively, the starting material may be first contacted with the solvent of the lowest solvent power (e.g. methanol) and then successively with solvents of increasing solvent power. The procedure is conveniently carried out in a vessel having a porous or perforated bottom, thereby to obtain a solution of the fraction soluble in a particular solvent. The fraction may then be removed from the solution by conventional means, e.g. by distilling off the solvent, preferably under reduced pressure in the case of higher boiling solvents such as quinoline.

The latter approach is preferred and a preferred mode of carrying out the solvent extraction is summarised in the table below which also indicates preferred temperature conditions for each step.

| Solvent Extraction step | Solvent | Solute | Residue | Temperatures |
|---|---|---|---|---|
| 1 | Methanol | $\epsilon$-fraction | $\alpha$-,$\beta$-,$\gamma$- and $\delta$-fractions | Warm, (e.g. 50–60° C.) |
| 2 | n-Heptane | $\delta$-fraction | $\alpha$-,$\beta$-and $\gamma$-fractions | Warm,(e.g. 50–60° C.) |
| 3 | Toluene | $\gamma$-fraction | $\alpha$-,and $\beta$-fractions | hot (e.g. 90–110° C.) |
| 4 | Quinoline | $\beta$-fraction | $\alpha$-fraction | hot (e.g. 90–110° C. |

As will be appreciated various pitches or coals will contain the various fractions in varying proportions and it will be a matter of simple trial to establish the relative fraction content of any particular pitch or coal and it may, in some cases be desirable to employ a mixture of pitches and/or coals as starting material in order to obtain the desired balance of final fractions.

The pitches used as starting material may be coal tar pitches or pitches derived from the distillation of petroleum refinery residues. The latter are generally preferred in view of their more ready commercial availability and their content of the desired fractions and an especially preferred pitch is that derived from ethylene cracker residues. The coals used as starting material are generally middle range coals and, as will be appreciated, will generally be employed in finely divided or powered form in order to expedite the solvent extraction process.

It may be noted that when using an ethylene cracker residue pitch, in which the α-fraction content is low, the last step (using quinoline) may be omitted and the combined α- and β-fractions (obtained as residues from step 3) used as first solid fraction.

When using the four solvents with ethylene cracker residue pitch, the following fractions are obtained in the following approximate yields, based on the weight of starting material:

α-fraction—1-2%
β-fraction—20-35%
γ-fraction—3-10%
δ-fraction—5-15%

As indicated above, the process of the invention is not limited to the use of the four above solvents in the solvent extraction process—clearly combinations of solvents having relative solvent powers for pitch and/or coal fractions comparable to those of the four listed above may be employed. The four listed solvents are however preferred in view of their ready aviailability. As a guide to the selection of other solvents two criteria may be mentioned. Firstly the solid fraction (e.g. the β-fraction metioned above) should be capable of producing a relatively coarse porous carbon (e.g. having a specific surface area of 50-250 m$^2$/gm).

Secondly, as an approximate guide, it is believed that the fractions noted above have the following approximate average molecular weights (it being appreciated of course that each is a mixture of compounds).

α-fraction—>400
β-fraction—400-350
γ-fraction—300-250
δ-fraction—<250.

The amount of liquid fraction added or absorbed in the first porous carbon is suitably from 5-25% by weight, based on the weight of the first porous carbon, and it has been found that amounts of this order are wholly absorbed by the first porous carbon at temperatures of about 100° C.

The carbonisation of the solid fraction to produce the first porous carbon is suitably carried out at a temperature of from 350° to 450° C., preferably from 400° to 450° C. and in the absence of air, for example in an inert atmosphere such as nitrogen.

The pore size of the first porous carbon, prior to absorbtion therein of the liquid fraction, may be increased by any conventional activation process, for example by heating at 350° to 450° C. in air or carbon monoxide or by chemical treatment using for example zinc chloride or phosphoric acid.

The carbonisation of the first porous carbon containing absorbed liquid fraction to produce the second porous carbon is also suitably carried out under similar conditions to those employed for carbonisation of the solid fraction.

The porous body produced with the invention is believed to comprise a relatively macroporous carbon body (produced by carbonisation of the solid fraction with or without subsequent activation) the walls of the pores being coated with relatively microporous carbon produced by carbonisation of the liquid fraction.

The resultant porous body may be further activated to increase its specific surface, as described above. In this way the specific surface area of the body may be increased from a value in the range 150 to 200 m$^2$/gm to a value in the range 300 to 400 m$^2$/gm.

The resultant porous carbon may be used as a catalyst support and catalyst may be introduced into the body by conventional means, for example by depositing catalyst materials in the porous carbon.

In order that the invention may be well understood, the following Examples are given by way of illustration only.

EXAMPLE 1

An ethylene cracker pitch having a ring and ball softening point of 105° C. was extracted with toluene to give a mixture of α- and β-fractions (33% by weight of starting pitch) as residue.

The mixture of α- and β-fraction was carbonised at 385° C. for 1 hour under nitrogen in a muffle furnace, with a reduction of about 25% of its weight, to give a first porous carbon.

An equal volume of n-heptane was added to the toluene solution to precipitate a α-fraction (about 5% by weight of original pitch). This was filtered off and to the solution was added an equal volume of methanol.

The solvents were distilled off from the mixture, the pressure being reduced from atmosphere to 20 mm Hg and temperature being increased from 60° C. to 110° C., to leave a liquid δ-fraction (about 10% by weight of original pitch).

The δ-fraction was mixed with the first porous carbon (in an amount of 24.4% by weight based on the weight of first porous carbon) at a temperature of about 100° C.

The resultant mixture was carbonised for 10 minutes at 400° C. in a muffle furnace under nitrogen, with a consequent reduction in weight of about 10%. to produce a second porous carbon having a specific surface area of 180 m$^2$/g (BET).

EXAMPLE 2

A coal tar pitch having a ring and ball softening point of 125° C. was extracted with Quinoline. The insoluble residue (α-resin), amounting to 9% of weight of the pitch, was filtered off and discarded and to the filtrate was added an equal volume of Toluene to precipitate a β-fraction. The β-fraction, amounting to 30% by weight of the starting pitch, was filtered off, dried and carbonised at 385° C. for one hour under nitrogen in a muffle-furnace, with a loss in weight of about 20%, to give a first porous carbon.

An equal volume of n-heptane was added to the toluene solution and the solvents evaporated, leaving a γ-fraction of about 8% by weight of the original pitch. The liquid Gamma fraction was mixed with the first porous carbon (in an amount of 12% by weight based on the weight of the first porous carbon) at a temperature of 100° C.

The resultant mixture was carbonised for 15 minutes, at 425° C., in a muffle-furnace, under nitrogen, with a consequent reduction in weight of about 5%, to produce a second porous carbon having a specific surface area of 250 m²/g (BET).

This material was further activated by heating in a muffle-furnace at 400° C. in air for 10 minutes and the porous carbon so produced was found to have a specific surface area of 340 m²/g (BET).

EXAMPLE 3

A mixture was prepared of coal tar pitch having a ring and ball softening point of 80° C. and powdered coal (N.C.B. Rank No. 305), the coal content being 30% by weight of the pitch and the mixing being conducted at a temperature of 140° C.

After extraction with quinoline was described in Example 2, the resin, amounting to 6% by weight of the pitch/coal mixture, was filtered off and discarded, and the α-resin was precipitated from the filtrate with toluene as described in Example 2. The β-fraction amounted to 25% by weight of the starting mixture and after filtration and drying was carbonised at 375° C. for one hour under nitrogen in a muffle-furnace, with a loss in weight of about 15%, to give a first porous carbon.

An equal volume of n-heptane was added to the toluene solution and the solvents evaporated, leaving a γ-fraction of about 15% by weight of the original pitch-/coal mixture. The liquid γ-fraction was mixed with the first porous carbon (in an amount of 5% by weight based on the weight of the first porous carbon) at a temperature of 100° C. The resultant mixture was carbonised for 10 minutes at 400° C. in a muffle-furnace, under nitrogen, with a consequent reduction in weight of about 10% to produce a second porous carbon having a specific surface area of 400 m²/g (BET).

I claim:

1. A method of producing a porous carbon which comprises the steps of:
    (1) subjecting pitch or coal to solvent extraction to produce
        (i) a solid fraction which is soluble in hot quinoline and insoluble in hot toluene, warm n-heptane and warm methanol, and
        (ii) a liquid fraction which is
            (a) one insoluble in warm methanol but soluble in warm n-heptane, hot toluene and hot quinoline or
            (b) one insoluble in warm methanol and warm n-heptane but soluble in warm toluene and hot quinoline;
    (2) carbonising the first solid fraction to produce a first porous carbon;
    (3) absorbing the said liquid fraction into said first porous carbon in an amount of from 5 to 25% by weight, based on the weight of the first porous carbon; and
    (4) carbonising the porous carbon containing absorbed liquid to produce a second porous carbon having a specific surface area greater than that of said first porous carbon.

2. A method as claimed in claim 1 in which the warm methanol and warm n-heptane solvents are at a temperature between about 50° C. and about 60° C., and the hot toluene and hot quinoline solvents are at a temperature between about 90° C. and about 110° C.

3. A method as claimed in claim 1, in which said solid fraction also contains up to 5% by weight of material insoluble in quinoline.

4. A method as claimed in claim 1 in which the fractions are derived from ethylene cracker residue pitch.

5. A method as claimed in claim 1 in which the fractions are derived from a mixture of pitch and coal dust.

6. A method as claimed in claim 1 in which the carbonisations are carried out at a temperature of from 400° to 450° C.

7. A method as claimed in claim 1 in which the first porous carbon is activated to increase its specific surface area before absorption therein of the liquid fraction by heating in air.

8. A method as claimed in claim 1 in which the second porous carbon is activated to increase its surface area by heating in air.

* * * * *